United States Patent
Umetani et al.

(10) Patent No.: US 9,099,713 B2
(45) Date of Patent: Aug. 4, 2015

(54) MODULE TERMINAL INCLUDING INTERFERENCE PREVENTIVE MEMBER

(75) Inventors: Akira Umetani, Yokohama (JP);
Toshiyuki Motohashi, Funabashi (JP);
Ryuichi Amagai, Isehara (JP)

(73) Assignees: PIOLAX INC., Yokohama-Shi, Kanagawa (JP); NISSAN MOTOR CO., LTD., Yokohama-Shi, Kanagawa (JP)

( * ) Notice: Subject to any disclaimer, the term of this patent is extended or adjusted under 35 U.S.C. 154(b) by 398 days.

(21) Appl. No.: 13/579,530

(22) PCT Filed: Sep. 30, 2010

(86) PCT No.: PCT/JP2010/067045
§ 371 (c)(1),
(2), (4) Date: Oct. 26, 2012

(87) PCT Pub. No.: WO2011/102016
PCT Pub. Date: Aug. 25, 2011

(65) Prior Publication Data
US 2013/0052495 A1  Feb. 28, 2013

(30) Foreign Application Priority Data
Feb. 17, 2010  (JP) ................................. 2010-032338

(51) Int. Cl.
*H01M 2/00* (2006.01)
*H01M 2/30* (2006.01)
(Continued)

(52) U.S. Cl.
CPC ............ *H01M 2/1061* (2013.01); *H01M 2/206* (2013.01); *H01M 2/30* (2013.01); *H01M 2/34* (2013.01); *H01M 10/0525* (2013.01); *H01M 2220/20* (2013.01)

(58) Field of Classification Search
CPC ..... H01M 2/1061; H01M 2/206; H01M 2/34; H01M 2/30; H01M 10/0525; H01M 2220/20
USPC .......................................................... 429/65
See application file for complete search history.

(56) References Cited

U.S. PATENT DOCUMENTS

| 7,504,179 B2 | 3/2009 | Tanjou et al. |
| 2002/0114994 A1 | 8/2002 | Yabuki et al. |
| 2003/0215702 A1 | 11/2003 | Tanjou et al. |

FOREIGN PATENT DOCUMENTS

| CN | 1372337 A | 10/2002 |
| JP | 2000-040500 A | 2/2000 |

(Continued)

OTHER PUBLICATIONS

Independent. Dictionary.com. Dictionary.com Unabridged. Random House, Inc. http://dictionary.reference.com/browse/independent (accessed: Feb. 24, 2015).*

(Continued)

*Primary Examiner* — Sean P Cullen
(74) *Attorney, Agent, or Firm* — McGinn IP Law Group, PLLC.

(57) ABSTRACT

A module terminal includes a terminal main body which is made of a metal plate and an insulative interference preventive member which is mounted on the terminal main body. In the terminal main body, one end portion is connected electrically to an electrode of a battery pack, and a female screw portion is formed integrally on a terminal portion to penetrate therethrough. While a distal end of a male screw faces an end face of the battery pack when the male screw into the female screw portion, the interference preventive member is disposed therebetween.

20 Claims, 20 Drawing Sheets

(51) Int. Cl.
  *H01M 2/34* (2006.01)
  *H01M 2/10* (2006.01)
  *H01M 2/20* (2006.01)
  *H01M 10/0525* (2010.01)

(56) References Cited

FOREIGN PATENT DOCUMENTS

| | | |
|---|---|---|
| JP | 2004-111098 A | 4/2004 |
| JP | 2005-347043 A | 12/2005 |
| JP | 2008-071638 A | 3/2008 |
| JP | 2009-231141 A | 10/2009 |
| JP | 2009-231267 A | 10/2009 |
| JP | 2009-283256 A | 12/2009 |

OTHER PUBLICATIONS

Chinese Office Action dated Jun. 24, 2014 with an English translation thereof.
European Search Report Dated Oct. 17, 2014.
International Search Report in PCT/JP2010/067045 dated Dec. 21, 2010 (English Translation Thereof).

* cited by examiner

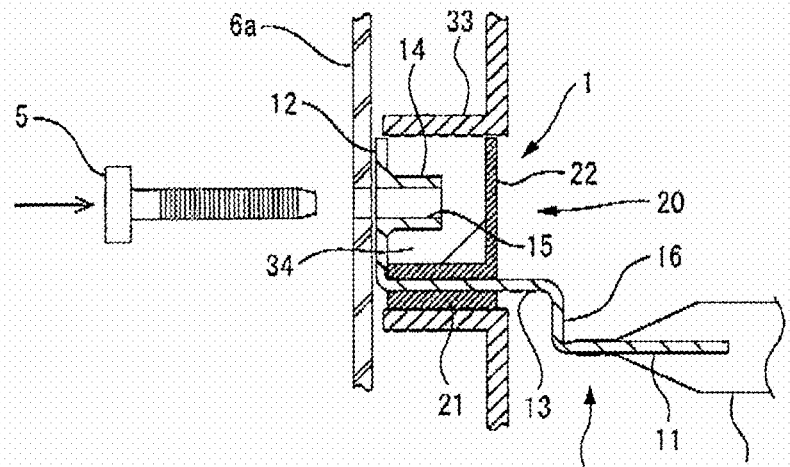
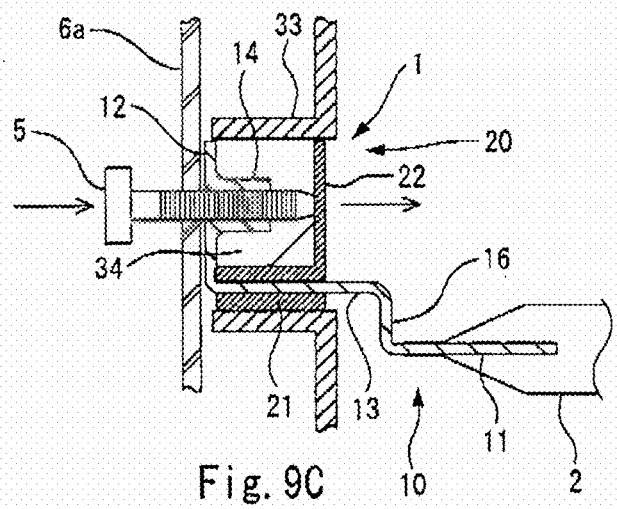
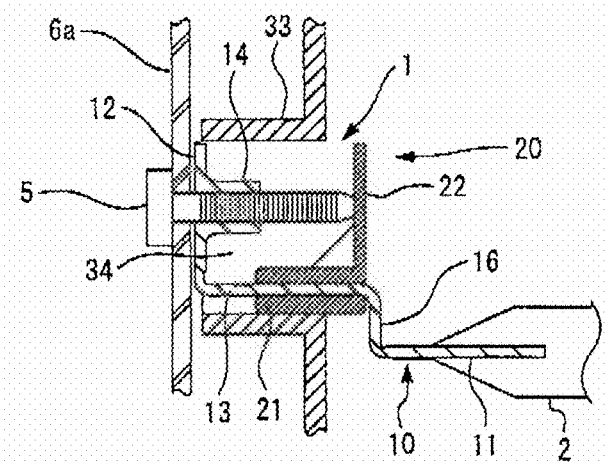

Fig. 18
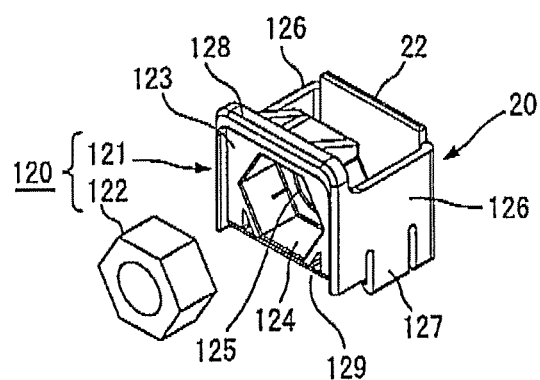
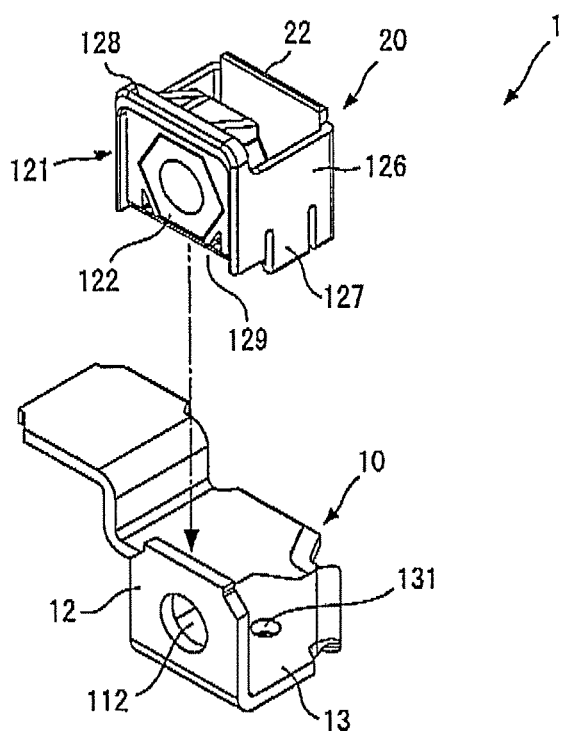

MODULE TERMINAL INCLUDING INTERFERENCE PREVENTIVE MEMBER

TECHNICAL FIELD

The present invention relates to a module terminal which is incorporated in a secondary battery module for inputting and outputting electric power and more particularly to, for example, a terminal for a module which makes up a secondary battery for an electric vehicle (including a hybrid vehicle) by being connected in plurality.

BACKGROUND ART

In recent years, low-pollution vehicles become popular with the growth of environmental conservation awareness. Because of this, research and development in order to increase the charge capacity of a secondary battery is made, and there is proposed a lithium ion secondary battery module such as one described in Patent Literature 1.

In Patent Literature 1, each of secondary battery cells which make up a secondary battery module is configured such that a positive electrode and a negative electrode (internal electrode pair) are laminated alternately with a separator interposed therebetween and an electrolyte is sealed in an insulating bag-shaped sheath, thereby realizing high energy density. By connecting the plural secondary battery cells (laminated battery cells) in series, charge capacity of the secondary battery module can be further increased.

In a secondary battery module including plural laminated battery cells like the one disclosed in Patent Literature 1, a male screw is screwed into a terminal provided on a laminated battery cell to fix an electric wiring. As this occurs, when the screwing work of the male screw is carried out carelessly, a tip of the male screw may hit a main body portion of the laminated battery cell to damage the same battery cell, or the tip of the male screw may abut the terminal or the electrode of the laminated battery cell to cause a short circuit.

RELATED ART LITERATURE

Patent Literature

Patent Literature 1: JP-2004-111098-A

DISCLOSURE OF THE INVENTION

Problems to be Solved by the Invention

The invention is made in view of these situations, and an object thereof is to provide a module terminal which prevents a male screw which screws into a female screw portion of a terminal main body from interfering with a main body or a terminal of a laminated battery cell.

Means for Solving the Problems

The invention provides a module terminal to be incorporated into a module, the module includes a battery pack in which a plurality of laminated battery cells are connected, the module terminal being provided for inputting/outputting electric power to/from the battery back, the module terminal including:

a terminal main body which is made of a metallic plate, which has a terminal portion for fixing an electric wiring in cooperation with a male screw, and which is electrically connected to an electrode of the battery pack; and an insulative interference preventive member which is mounted on the terminal main body, and wherein the terminal main body or the interference preventive member has a female screw portion for screwing the male screw therethrough such that a distal end of the male screw faces an end face of the battery pack, and wherein the interference preventive member is disposed between the distal end of the male screw that is screwed into the female screw portion and the end face of the battery pack, such that the interference preventive member includes a mounting portion detachably mounted on the terminal main body and a wall portion disposed between the distal end of the male screw that is screwed into the female screw portion and the end face of the battery pack.

According to the above configuration, when the male screw is screwed into the female screw portion, the interference preventive member is interposed between the distal end of the male screw and the end face of the battery pack, so that the distal end of the male screw abuts the interference preventive member. Due to this, the interference of the male screw with the main body of the laminated battery cell and the terminal thereof can be avoided. More specifically, the wall portion can be disposed between the distal end of the male screw that is screwed into the female screw portion and the end face of the battery pack only by mounting the mounting portion of the interference preventive member on the terminal main body. Thus, the interference preventive configuration for preventing the interference with the main body or the terminal of the laminated battery cell can be formed by the simple assembling work.

While the basic configuration of the invention is described above, the respective portions can cart specifically be configured as follows.

The invention may also provides, based on the above configuration, the module terminal, wherein the terminal main body is formed by one end portion of the terminal portion, and the female screw portion is provided in the terminal portion.

The invention may also provides, based on the above configuration, the module terminal, wherein a flat plate-shaped mounting area is formed on the terminal main body, wherein the mounting portion of the interference preventive member includes a flat plate-shaped base portion and a flexible clip-like mounting piece which is disposed parallel to a bottom surface of the base portion with a constant space defined therebetween, one side edges of the base portion and the mounting piece being connected, and wherein the interference preventive member is slidably mounted on the terminal main body by holding the mounting area with the base portion and the mounting piece.

According to the above configuration, the interference preventive member can easily be mounted on the terminal main body only by holding the mounting area of the terminal main body with the base portion and the mounting piece of the interference preventive member. Moreover, since the interference preventive member is slidable over the mounting area of the terminal main body, even when the projecting length of the distal end of the male screw differs, the difference in the projecting length can be absorbed by the interference preventive member.

The invention may also provides, based on the above configuration, the module terminal, wherein the mounting portion of the interference preventive member is fitted in the mounting area of the terminal main body from the other side edges of the base portion and the mounting piece which are opened, and dislodgement preventive claws are formed on the other side edges of the base portion and the mounting piece so as to engage with edges of the mounting area.

According to the above configuration, an unintentional dislodgement of the interference preventive member can be prevented.

The invention may also provides, based on the above configuration, module terminal, wherein, in the terminal main body, an end portion of the mounting area which lies closer to the other end portion is bent to form a bent portion as a stopper which restricts a sliding range of the interference preventive member.

According to the above configuration, the sliding range of the interference preventive member is restricted by the stopper, thereby preventing the laminated battery cell or the terminal thereof from being damaged as a result of the interference preventive member abutting the main body or the terminal of the laminated battery cell by a pressing force transmitted from the male screw.

The invention may also provides, based on the above configuration, the module terminal, wherein the interference preventive member is provided with biasing means for biasing the interference preventive member towards the terminal portion of the terminal main body in which the female screw portion is formed.

According to the above configuration, the interference preventive member is biased towards the terminal main body by the biasing means. Thus, the interference preventive member is caused to abut the distal end of the male screw with the biasing force. Even when vibration is applied to the secondary battery from the outside, the looseness or unintentional sliding of the interference preventive member can be prevented.

The invention may also provides, based on the above configuration, the module terminal, wherein, in the terminal main body, a cylindrical bulge portion is drawn from the terminal portion, and the female screw portion is formed on an inner circumferential surface of the bulge portion.

Since the female screw portion is formed integrally at one end portion (terminal portion) of the terminal main body which is made of the metallic plate by simple machining work, as compared with the configuration in which a nut member is welded to the one end portion of the terminal main body, the number of parts is reduced, which is preferable in mass production of terminals.

The invention may also provides, based on the above configuration, the module terminal, wherein the interference preventive member have the female screw portion so as to face the wall portion.

The invention may also provides, based on the above configuration, the module terminal, wherein the female screw portion includes a female screw holder which faces the wall portion and a nut member which is mounted in the female screw holder.

According to the above configuration, the female screw portion is formed by incorporating the nut member in the female screw holder formed in the interference preventive member. Therefore, the assembling work can easily be carried out. For example, when the interference preventive member is resin molded, the female screw holder can be molded integrally. Moreover, since the threading of the terminal member or the welding of the nut member is unnecessary, the production process can be simplified.

The invention may also provides, based on the above configuration, the module terminal, wherein the module includes a casing which accommodates the battery pack, and an angular tube-shaped extending portion is formed on the casing, and wherein the female screw holder is inserted in the angular tube-shaped extending portion and abuts an inner circumferential surface of the extending portion by a rotational moment received via the female screw holder from the male screw to restrict an entrainment of the interference preventive member.

According to the above configuration, when the male screw is screwed into the female screw portion, the female screw holder abuts the inner circumferential surface of the extending portion of the casing to restrict the entrainment of the interference preventive member and the terminal main body on which the interference preventive member is mounted. Therefore, the terminal main body is prevented from moving to break an electrical connection between the battery pack and the electrode.

The invention may also provides, based on the above configuration, the module terminal, wherein the female screw holder has a circumferential wall potion which covers a circumference of the terminal portion of the terminal main body.

According to the above configuration, since the circumference of the terminal portion of the terminal main body is covered by the circumferential wall portion formed on the female screw holder, the generation of metallic striking sound can be prevented which would otherwise result from the circumference of the terminal portion abutting the inner circumferential surface of the extending portion of the casing.

The invention may also provides, based on the above configuration, the module terminal, wherein the terminal portion is formed by one end portion of the terminal main body, and the mounting area is formed on a portion of the terminal main body other than the one end portion, and wherein the interference preventive member has locking claws formed to elastically engage with both side edges of the mounting area from the outside to project further than a bottom surface of the mounting area.

According to the above configuration, the locking claws of the interference preventive member is interposed between both the side edges or the bottom surface of the mounting area of the terminal main body and the inner circumferential surface of the extending portion of the casing, thereby preventing the generation of metallic striking sound which would otherwise result from both the side edges or the bottom surface of the mounting area of the terminal main body abutting the inner circumferential surface of the extending portion of the casing.

The invention may also provides, based on the above configuration, the module terminal, wherein the female screw holder has a front wall portion formed to face the terminal portion of the terminal main body, and the front wall portion and the circumferential wall portion are connected to each other, wherein the female screw holder has a cutout portion formed in part of the circumferential wall portion to introduce the terminal portion of the terminal main body to be guided to an opposite position to the front wall portion, and wherein, by introducing the terminal portion of the terminal main body from the cutout portion to be guided to the opposite position to the front wall portion, the locking claws elastically engage with both the side edges of the mounting area of the terminal main body from the outside, and the circumferential wall portion of the female screw holder covers the circumference of the terminal portion of the terminal main body.

The invention may also provides, based on the above configuration, the module terminal,
wherein the interference preventive member has a side wall on each of both left and right side surfaces so as to be connected to the wall portion and the female screw holder, and when the side walls are inserted in the angular tube-shaped extending portion, the side walls abut the inner circumferential surface of the extending portion by the rotational moment received via the interference preventive member from the male screw to restrict the entrainment of the interference preventive member.

According to the above configuration, the side walls formed on the interference preventive member abut the inner circumferential surface of the extending portion to thereby restrict the entrainment of the interference preventive member and the terminal main body which is mounted thereon. Therefore, the interference preventive member is prevented from being subjected to the rotational moment, thereby more stably holding the electrical connection between the terminal main body and the electrode of the battery pack.

The invention may also provides, based on the above configuration, the module terminal,
(a) wherein the terminal portion is formed by one end portion of the terminal main body, and the mounting area is formed on a portion of the terminal main body other than the one end portion,
(b) wherein the female screw holder has a front wall portion formed to face the terminal portion of the terminal main body and a circumferential wall portion which covers a circumference of the terminal portion, and the front wall portion and the circumferential wall portion are connected to each other,
(c) wherein the interference preventive member has locking claws formed at the mounting portion so as to elastically engage with the mounting area of the terminal main body,
wherein the female screw holder has a cutout portion formed in part of the circumferential wall portion to introduce the terminal portion of the terminal main body to be guided to an opposite position to the front wall portion, and
wherein, during the process of introducing the terminal portion of the terminal main body from the cutout portion to be guided to the opposite position to the front wall portion, the locking claws elastically engage with the mounting area of the terminal main body,
(d) wherein the terminal main body has a positioning hole in the mounting area,
wherein the interference preventive member has a positioning pin which is inserted into the position hole, and
wherein, during the process of introducing the terminal portion of the terminal main body from the cutout portion to be guided to the opposite position to the front wall portion, the positioning pin is inserted into the positioning hole, and
(e) wherein the positioning pin is formed into a pyramid shape which is tapered from a proximal end towards a distal end thereof and is sized such that side vertexes continues abutting an inner circumference of the positioning hole at the proximal end.

According to the above configuration, the circumference of the terminal portion of the terminal main body is covered by the circumferential wall portion formed on the female screw older of the interference preventive member, thereby preventing the generation of metallic striking sound which would otherwise result from the terminal portion abutting the inner circumferential surface of the extending portion of the casing.

Additionally, only by introducing the terminal portion of the terminal main body from the cutout portion formed in the female screw holder to be guided to the opposite position to the front wall portion, the locking claws can be guided to elastically engage with the mounting area of the terminal main body. Moreover, during the assembling process, the positioning pin can be also inserted into the positioning hole with a proper posture. Thus, excessive stress will not be applied to the locking claws or the positioning pin to break them.

The invention may also provides, based on the above configuration, the module terminal,
wherein the terminal main body is formed by bending three-dimensionally a belt-shaped metal plate, and the terminal main body includes a twisted portion formed by twisting upwardly and then drawing perpendicularly an intermediate portion of the belt-shaped metal plate.

According to the above configuration, since the belt-shaped metallic plate is bent to form the terminal main body, as compared with a blanking approach, the amount of waste material can be reduced and hence, a good yield of material can be realized, thereby suppressing the material costs to an inexpensive level.

BRIEF DESCRIPTION OF THE DRAWINGS

FIG. 6A is a top plan view, FIG. 6B is a front view and FIG. 6C is a side view.

FIGS. 9A to 9C show sequential operations of screwing a male screw into the module terminal.

FIGS. 17A and 17B show one of electric power input/output module terminals as seen in different directions, FIGS. 17C and 17D show an intermediate voltage measuring module terminal as seen in different directions, and FIGS. 17E and 17F show the other of the electric power input/output module terminals as seen in different directions.

FIG. 18 shows an exploded state of the module terminal according to the second embodiment.

FIG. 19A shows a pre-worked metal plate (material) from above, and FIG. 19B shows perspectively the terminal main body.

FIG. 20 shows an interference preventive member according to the second embodiment.

DESCRIPTION OF REFERENCE NUMERALS

Figure 1:
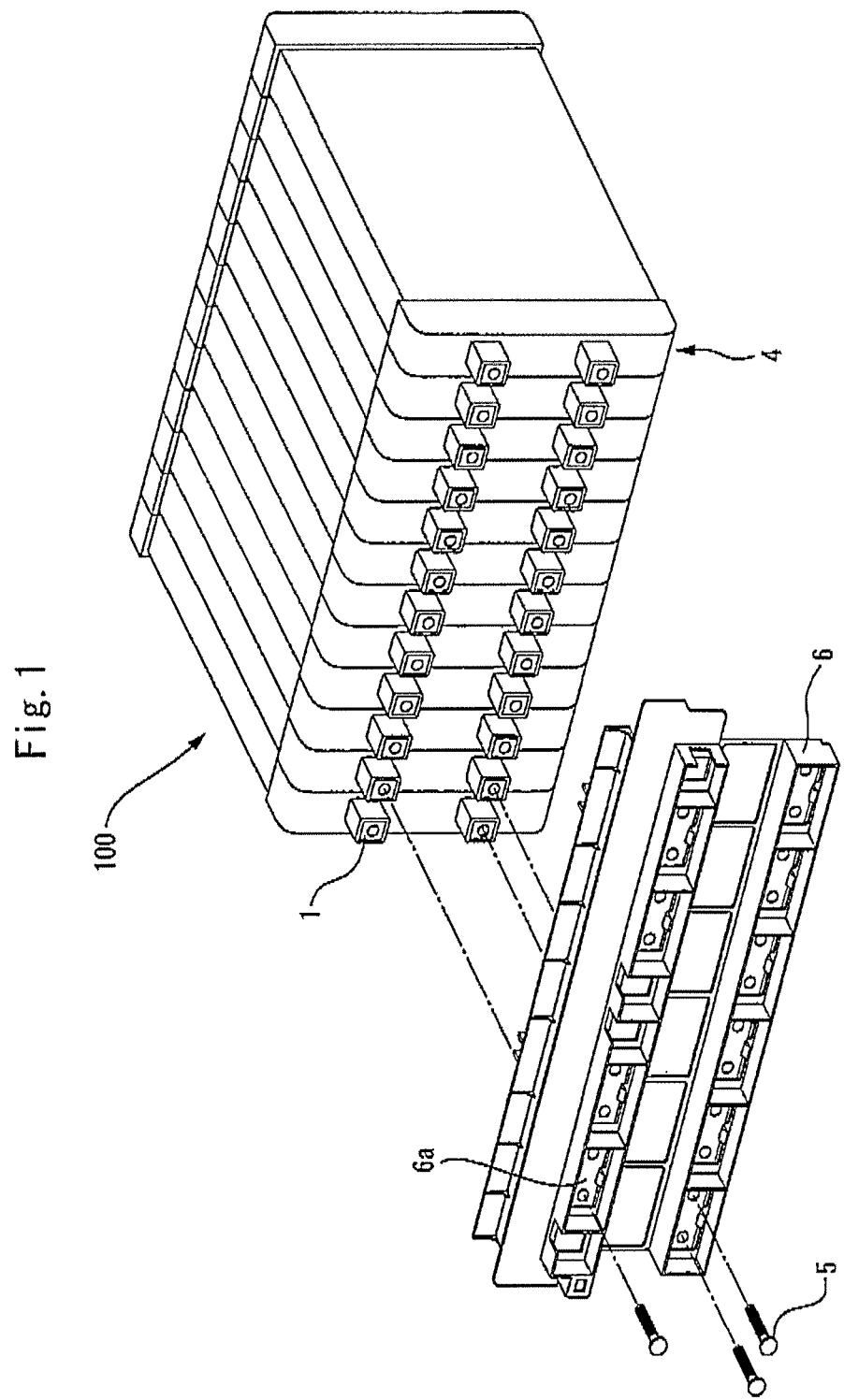
FIG. 1 shows an exploded state of a secondary battery made up of modules in which module terminals according to a first embodiment are incorporated.

1: Module terminal; 2: Laminated battery cell; 2a: Bag-shaped sheath; 2b: Positive terminal; 2c: Negative terminal; 3: Battery pack; 3a: Conductor member; 4: Module; 5: Male screw; 6: bus bar; 6a: Conductor plate 10; Terminal main body; 11: Other end portion; 12: Terminal portion; 13: Mounting area; 14: Bulge portion; 15: Female screw portion; 16: Bent portion 20: Interference preventive member; 21: Mounting portion; 21a: Base portion; 21b: Mounting piece; 22: Wall portion; 23: Rib; 24: Support Wall; 25: Elastic piece; 26: Side wall; 27: Dislodgement preventive claw; 28: Arm portion 30: Casing; 31: Tubular member; 32: Lid member; 33: Extending portion; 34: Insertion hole 100: Secondary battery 110: Metal plate; 111: Twisted portion; 112: Through hole; 113: Step portion; 114: Flat surface 120: Female screw portion; 121: Female screw holder; 122: Nut member; 123: Front wall portion; 124: Fitting depressed portion; 125: Through hole; 126: Side wall; 127: Locking claw; 128: Circumferential wall portion; 129: Cut-out portion; 130: Positioning pin; 131: Positioning hole.

Best Mode for Carrying out the Invention

Embodiments of the invention will be described by reference to the drawings.

First Embodiment

FIGS. 1 to 13B show a module terminal according to a first embodiment of the invention.

A module 4 incorporates a battery pack 3 which is made up by connecting plural laminated battery cells 2 together. A module terminal 1 of this embodiment is incorporated in the module 4 as a terminal for inputting and outputting electric power. This module 4 is used to make up a secondary battery 100 installed in, for example, an electric vehicle.

The secondary battery 100 to be installed in the electric vehicle is assembled, as shown in FIG. 1, by aligning plural modules 4 in a horizontal direction and connecting the adjacent modules 4 in series. In this connection, a male screw 5 is screwed into the module terminal 1 via a conductor plate 6a of a bus bar 6. The conductor plates 6a are arranged in the bus bar 6 to connect the modules 4 in series, and the secondary battery 100 can be assembled only by screwing the male screws 5. The capacity of the secondary battery 100 is increased by connecting the plural modules 4 in series. Thus, the secondary battery 100 can be constituted as an electric power supply suitable for an electric vehicle.

An application of the module 4 is not limited to the secondary battery 100 of the electric vehicle. For example, the module 4 can be applied to a module for an UPS (Uninterruptible Power Supply) or load leveling of electric power.

Figure 2:
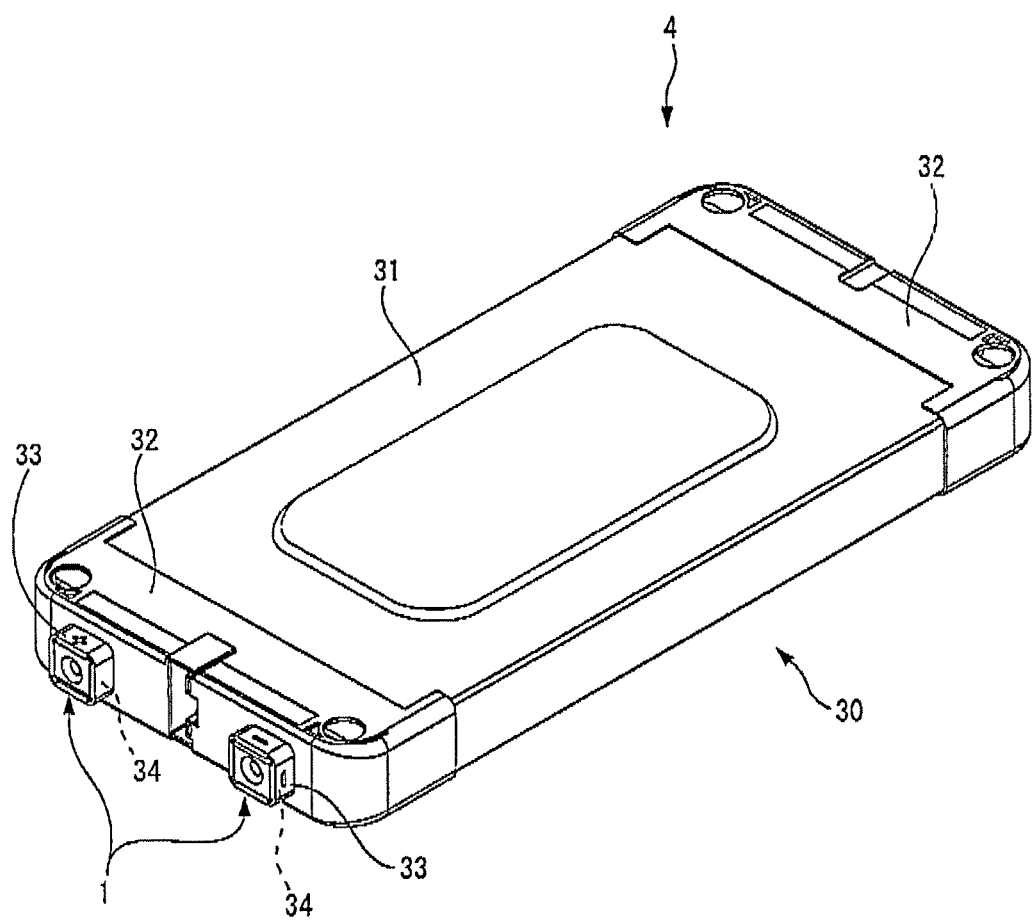
FIG. 2 shows the module in which the module terminals according to the first embodiment are incorporated.
Figure 3:
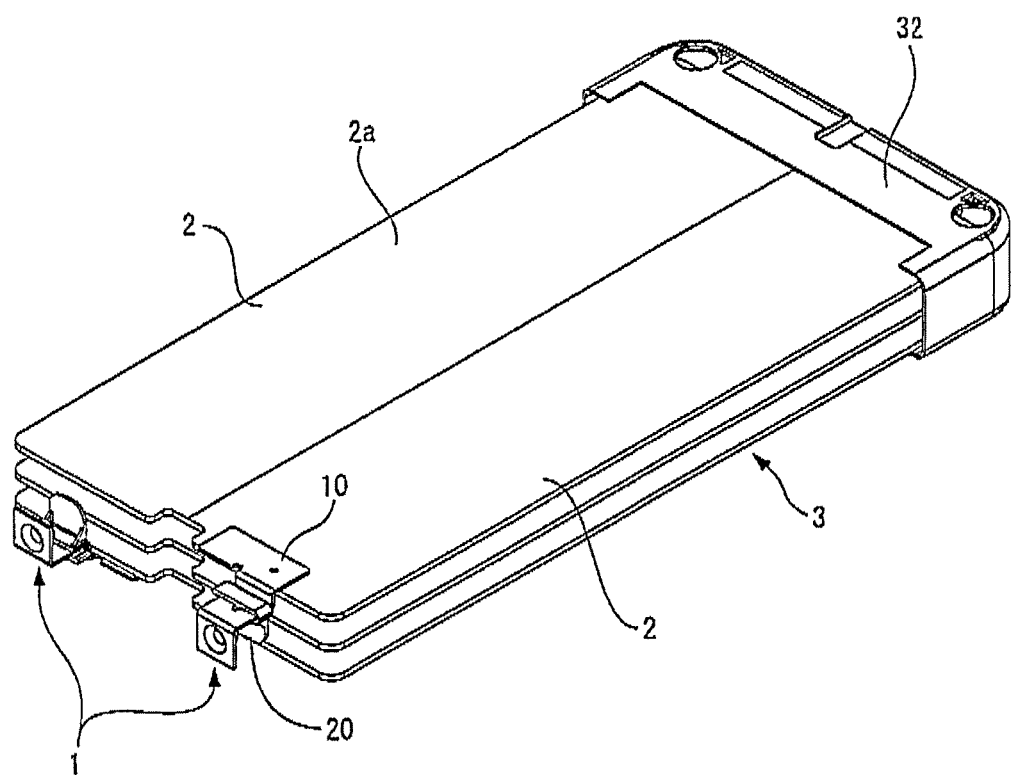
FIG. 3 shows an internal configuration of the module shown in FIG. 2.

As shown in FIGS. 2 and 3, the module 4 includes the battery pack 3 which is made up by connecting the plural laminated battery cells 2 together, a casing 30 which encloses the battery pack 3 and module terminals 1 for inputting/outing electric power to/from the battery pack 3.

A lithium ion battery having high energy density and sealing performance is used for the laminated battery cells 2. The lithium ion battery used in this embodiment is a sheet-shaped battery in which an interior electrode pair, a separator and electrolyte (none of which is shown) are sealed in a flat rectangular flexible bag-shaped sheath 2a. Since the configuration and principle of this lithium ion battery are known, the detailed description thereof will be omitted. The bag-shaped sheath 2a is formed of a laminated film including a thermoplastic resin as an inner surface layer, a metal foil as an intermediate layer and an insulating resin as an outer layer. The bag-shaped sheath 2a seals the laminated battery cell 2 to ensure the electric insulation other than a positive terminal 2b and a negative terminal 2c which extend outwardly of the bag-shaped sheath 2a.

Figure 4:
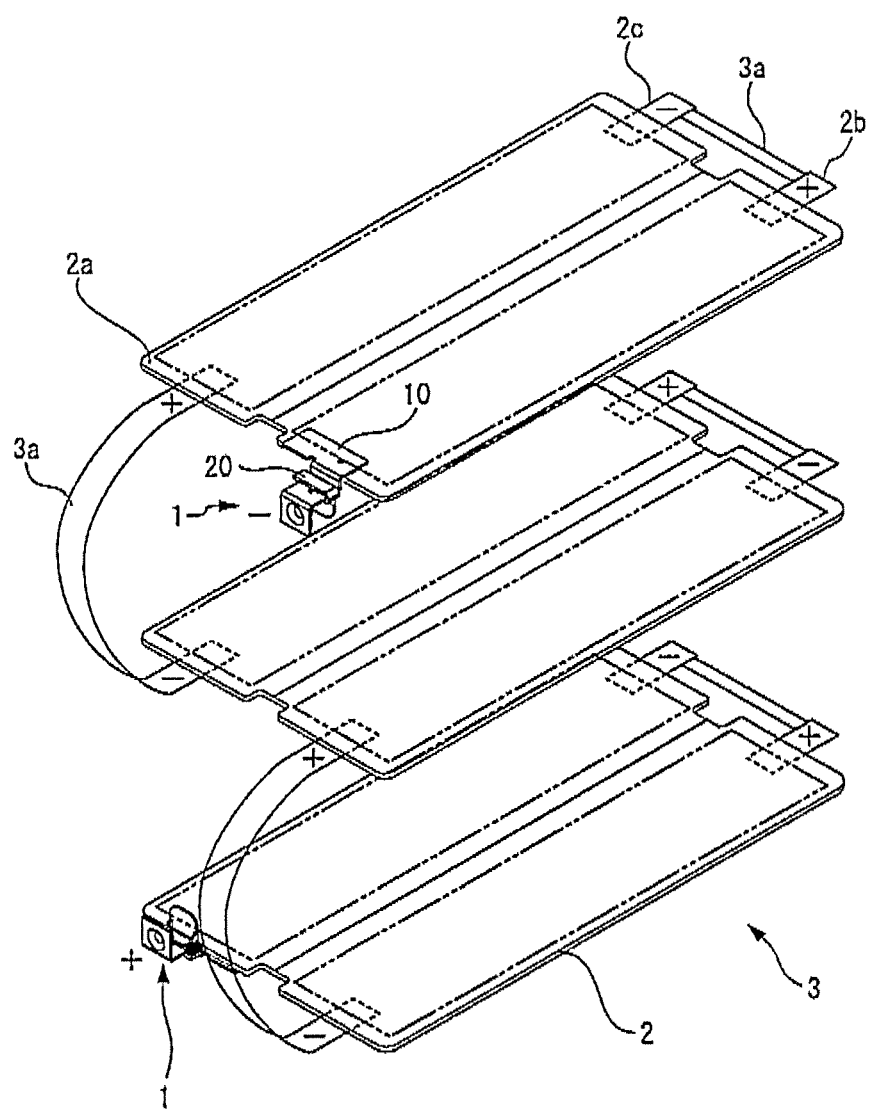
FIG. 4 shows an electrical connection of laminated battery cells accommodated in the module shown in FIG. 2.
Figure 5:
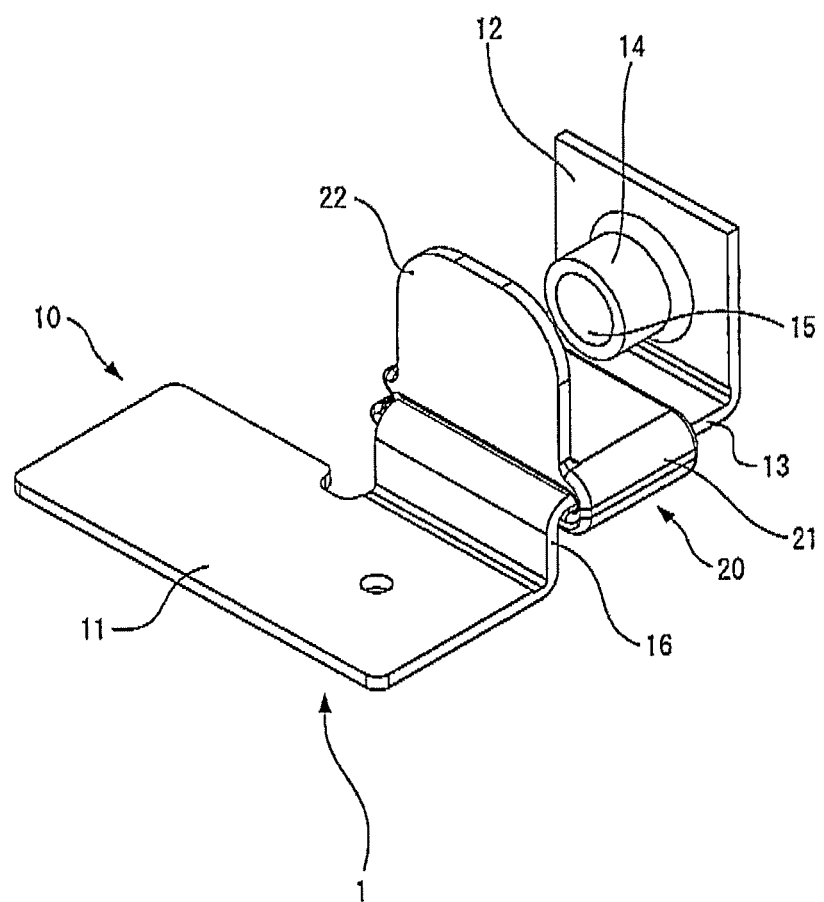
FIG. 5 shows perspectively the module terminal according to the first embodiment.

As shown in FIG. 3, in the battery pack 3, the laminated battery cells 2 are stacked in plural layers (three layers in this embodiment) and aligned in plural rows (two rows in this embodiment). For example, as shown in FIG. 4, the positive terminal 2b and the negative terminal 2c are electrically connected via a conductor member 3a. Thus, in the battery pack 3, the laminated battery cells 2 are connected in series. Terminal for inputting and outputting, electric power is provided to the outermost laminated battery cells 2 of the battery pack 3. The module terminals 1 are incorporated with the outermost laminated battery cells 2. For example, in the case of configuring a battery pack 3 by connecting two rows and two layers of laminated battery cells 2, the positive terminal 2b and the negative terminal 2c can be connected electrically as shown in FIG. 4 of Patent Literature 1 (JP-2004-111098-A). The method shown in FIGS. 5 and 6 of Patent Literature 1 can also be adopted for the connecting method of connecting terminals of the laminated battery cells 2.

The battery pack 3 is accommodated in the casing 30, and thus, the casing 30 defines an exterior of the module 4 as shown in FIG. 2. The casing 30 includes a rectangular parallelepiped tubular member 31 and lid members 32 which are attached to both end portions of the tubular member 31. For example, the tubular member 31 can be formed of an aluminum alloy in view of a strength adequate for sustaining the rectangular parallelepiped shape and a weight reduction of the module 4. On the other hand, the lid member 32 is formed of an insulative synthetic resin. The lid member 32 defines an accommodation space (not shown) adequately for maintaining the positive terminal 2b and the negative terminal 2c of each laminated battery cell 2 in an insulated state. Therefore, the terminals of the laminated battery cells 2 can be prevented from abutting each other by the lid members 32 even when vibration during driving or impact due to collision is applied to an electric vehicle in which the secondary battery 100, for example.

As shown in FIGS. 5 to 8D, the module terminal 1 includes a terminal main body 10 and an interference preventive member 20.

The terminal main body 10 is formed of a copper metal plate and has conductivity and flexibility. The terminal main body 10 is formed by bending the metal plate into a step-like shape as shown in FIGS. 7A to 7D. This terminal main body 10 has a terminal portion 12 which is formed by bending one end portion of the metal plate substantially at right angles, the other end portion 11 having a flat surface shape, and a flat plate-shaped mounting area 13 which extends from the other end portion 11 to a proximal end of the terminal portion 12 via a bent portion 16.

The other end portion 11 of the terminal main body 10 is inserted into the outermost laminated battery cell 2 of the battery pack 3 to be connected to an interior electrode pair inside the bag-shaped sheath 2a. Thus, the module terminal 1 functions as a terminal for inputting/outputting electric power to/from the battery pack 3.

When the other end portion 11 is connected to the battery pack 3, the mounting area 13 extends from an end face of the battery pack 3. The interference preventive member 20 is mounted on the mounting area 13.

The one end portion functions as the terminal portion 12 which fixes an electric wiring in cooperation with the male screw 5. This terminal portion 12 has a substantially square flat plate-like shape, and a bulge portion 14 is formed at a central portion of the terminal portion 12. The bulge portion 14 is formed by drawing the terminal portion 12 into a cylindrical shape, and a female screw portion 15 is formed on an inner circumferential surface thereof.

Thus, the female screw portion 15 is formed integrally with the terminal main body 10 by drawing the one end portion thereof and threading the inner circumferential surface of the drawn portion. An opening at a distal end of the female screw portion 15 faces the battery pack 3, and a male screw 5 is screwed into the female screw portion 15 from a proximal end thereof.

On the other hand, as shown in FIGS. 8A to 8D, the interference preventive member 20 is a resin molded product of an insulative synthetic resin, in which a mounting portion 21 and a wall portion 22 are molded integrally. The mounting portion 21 includes a flat plate-shaped base portion 21a and a mounting piece 21b which is disposed parallel to a bottom surface of the base portion 21a with a constant space defined therebetween. The base portion 21a and the mounting piece 21b are connected together at one side edges thereof to form a substantially U-shape, and the mounting piece 21b functions as a flexible clip. Dislodgement preventive claws 27 is formed at the other side edges (opposite side edges to the connected side edges) of the base portion 21a and the mounting piece 21b.

The interference preventive member 20 is mounted slidably on the terminal main body 10 by holding the mounting area 13 with the base portion 21a and the mounting piece 21b. The dislodgement preventive claws 27 engage with edges of the mounting area 13 to thereby prevent an unintentional dislodgement of the interference preventive member 20. On the other hand, the interference preventive member 20 can easily be removed from the mounting area 13 only by deflecting the mounting piece 21b so as to move away from the mounting piece 21b to thereby disengage the dislodgement preventive claws 27 from the terminal main body 10. Thus, the interference preventive member 20 can be easily attached/detached to/from the terminal main body 10 with the simple configuration, thereby enhancing a working efficiency.

A rib 23 is formed on the mounting piece 21b on a surface which faces the base portion 21a. This rib 23 causes the mounting piece 21b to deflect from the mounting area 13 so as to enhance the elastic force of the mounting piece 21b and to thereby increase the frictional force between the base portion 21a and the mounting area 13. Thus, the interference preventive member 20 is prevented from freely moving over the mounting area 13.

The wall portion 22 projects perpendicularly from a rear end portion of the mounting piece 21b and is formed into a flat plate shape. Support walls 24 are formed integrally at both sides of the wall portion 22, thereby increasing the rigidity against pressures from a front-to-rear direction (refer to FIGS. 8A to 8D). When the male screw 5 is screwed into the female screw portion 15, a distal end face of the male screw 5 faces the support walls 24.

Next, an assembling of the module terminal 1 of the embodiment will be described.

Figure 6A:
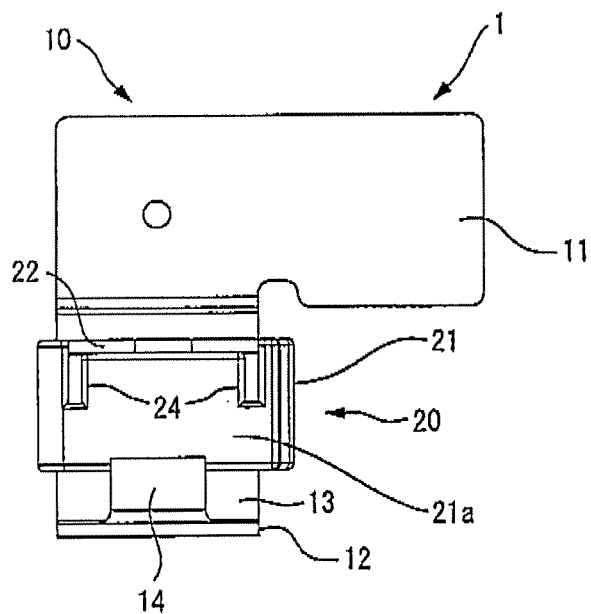
FIGS. 6A to 6C show the module terminal according to the first embodiment.
Figure 6B:
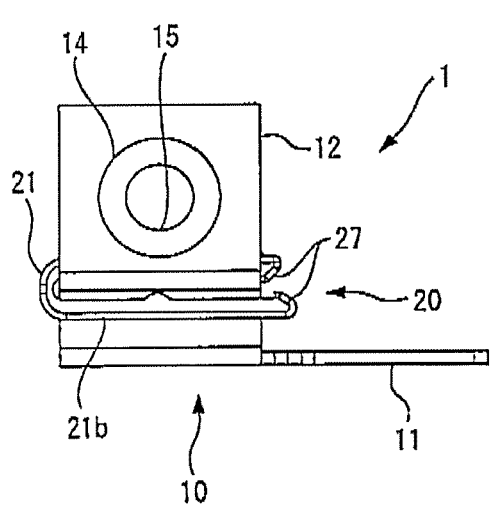
Figure 6C:
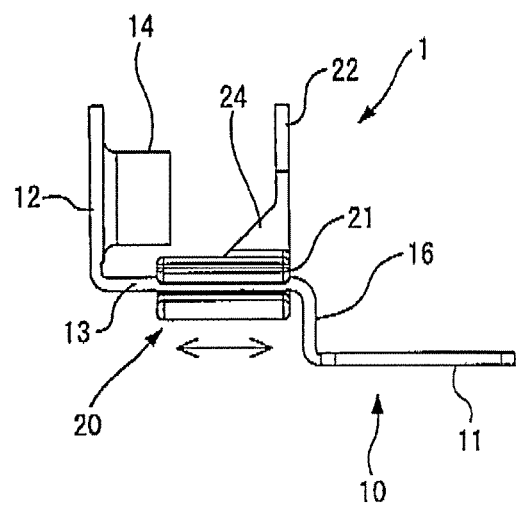
Figure 7B:
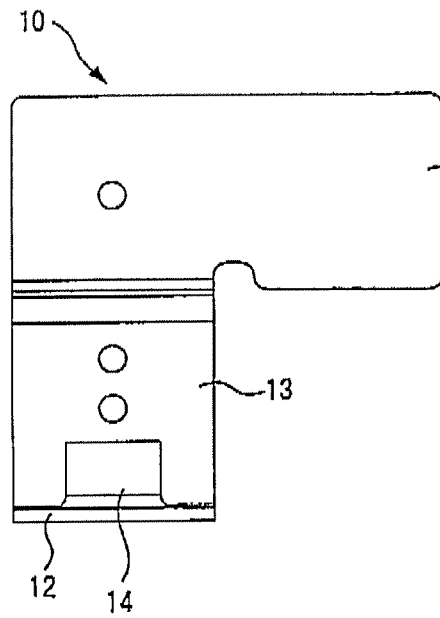
FIGS. 7A to 7D show a terminal main body of the module terminal.
Figure 7A:
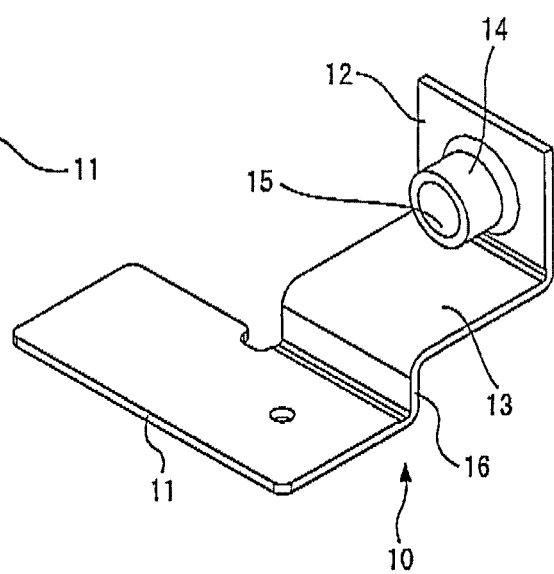
Figure 7C:
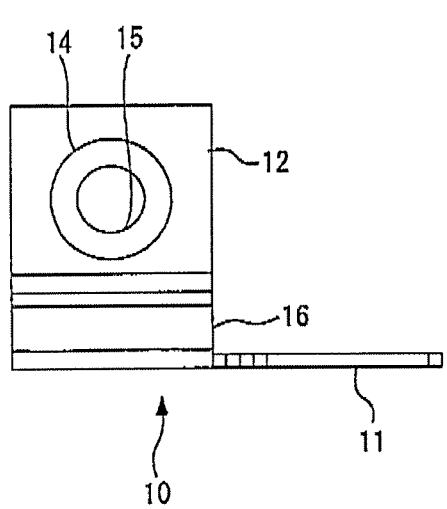
Figure 7D:
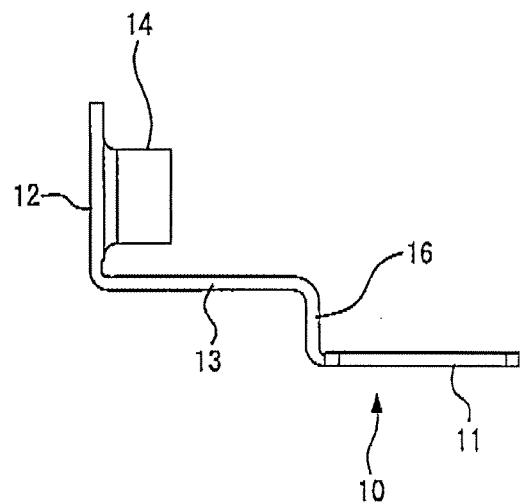
Figure 8B:
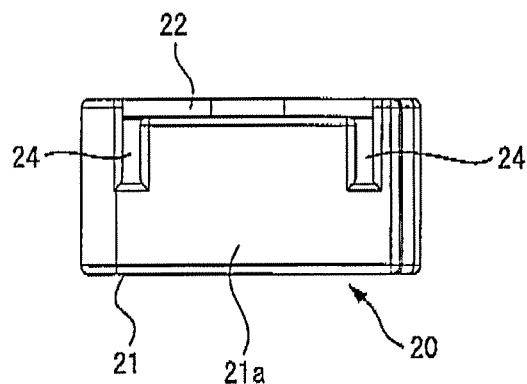
FIGS. 8A to 8D show an interference preventive member of the module terminal.
Figure 8A:
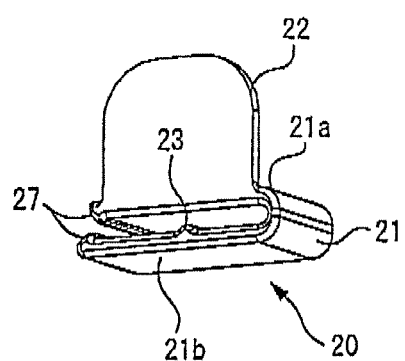
Figure 8C:
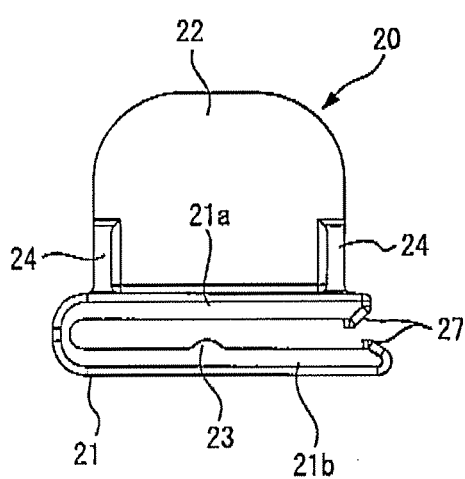
Figure 8D:
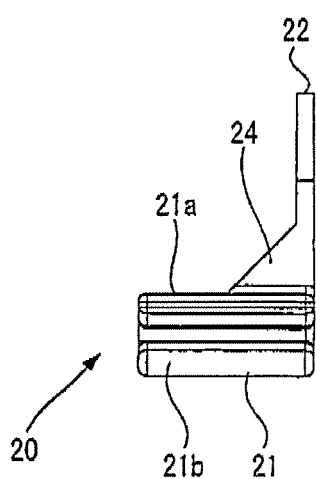

In the process of producing the laminated battery cell 2, the other end portion 11 of the terminal main body 10 is inserted in advance in the laminated battery cell 2 so as to be electrically connected thereto. The module terminal 1 is assembled by mounting the interference preventive member 20 on the terminal main body 10 which projects from the laminated battery cell 2. Specifically, as shown in FIG. 6C, the interference preventive member 20 is mounted on the terminal main body 10 by adjusting the posture such that the wall portion 22 is positioned close to the laminated battery cell 2 but faces the terminal portion 12 and then clipping the mounting area 13 with the mounting portion 21, so as to be slidable over the mounting area 13.

By positioning the wall portion 22 close to the laminated battery cell 2 in the assembling of the module terminal 1, a sufficient moving range for the interference preventive member 20 can be secured.

In the terminal main body 10, the end portion of the mounting area 13 which lies close to the other end portion 11 is bent to form the bent portion 16 as a stopper which restricts a sliding range of the interference preventive member 20. Thus, the mounting portion 21 is slidable between the terminal portion 12 and the bent portion 16 (that is, over the mounting area 13).

In the assembling of the module terminal 1, the wall portion 22 of the interference preventive member 20 faces an end edge of the bulge portion 14 which extends from the terminal portion 12 with a parallel posture. Thus, the wall portion 22 is interposed between the female screw portion 15 on the inner circumferential surface of the bulge portion 14 and an end face of the battery pack 3 as a bulkhead.

When the battery pack 3 is accommodated in the casing 30, thus-assembled module terminal 1 engages with the lid member 32 of the casing 30. As shown in FIG. 2, a pair of angular tube-shaped extending portions 33 are formed in positions on a lateral side of the lid member 32, and the module terminals 1 are inserted into insertion holes 34 formed in the extending portions 33.

While the terminal portion 12 of the terminal main body 10 has the substantially square shape, the interference preventive member 20 also has an angular portion defined by the mounting piece 21b of the mounting portion 21 and the support walls 24 as viewed from front. As shown in FIG. 2, when the module terminal 1 is inserted into the angular hole-shaped insertion hole 34, an inner circumferential surface of the insertion hole 34 fits on the terminal portion 12 and the interference preventive member 20, thereby preventing the rotation of the module terminal 1. By preventing the rotation of the module terminal 1, the screwing work of the male screw 5 into the female screw portion 15 can be executed more efficiently.

Thus, the module 4 including the module terminal 1 is completed.

FIGS. 9A to 9C show sequential operations of screwing the male screw into the module terminal according to the embodiment. Next, by reference to the figures, the operations of screwing the male screw 5 into the module terminal 1 will be described.

The completed module 4 is connected to the bus bar 6, by superposing a conductor plate 6a of the bus bar 6 on the terminal portion 12 so that a threaded hole in the conductor plate 6a coincides with the female screw portion 15 of the terminal portion 12, and then inserting/screwing the male screw 5 into the female screw portion 15 (refer to FIG. 9A).

When the male screw 5 is kept screwed in this state, a distal end face of the male screw 5 abuts the wall portion 22 of the interference preventive member 20 (refer to FIG. 9B). As this occurs, since the cylindrical bulge portion 14 guides the male screw 5 in the inserting direction, the male screw 5 can abut the wall portion 22 effectively.

When the male screw 5 is kept screwed further, the wall portion 22 is pressed by the distal end face of the male screw 5. In the module terminal 1, since the inserting direction of the male screw 5 and the extending direction of the mounting area 13 are the same, the mounting portion 21 is allowed to move smoothly as the wall portion 22 is so pressed.

The mounting portion 21 is pushed towards the laminated battery cell 2 in accordance with the insertion of the male screw 5 until the conductor plate 6a is connected completely to the module terminal 1 by the male screw 5 (refer to FIG. 9C). When the male screw 5 is fastened in the module terminal 1, while the wall portion 22 abuts the male screw 5, a sufficient space is ensured on the side of the battery pack 3 within the module 4. For example, by designing the module 4 to minimize the space, a reduction in size of the module 4 can be realized.

Since the interference preventive member 20 is slidable over the mounting area 13, even when the projecting length of the distal end of the male screw 5 differs, the difference in the projecting length can be absorbed by the interference preventive member, thereby providing superior general-purpose properties.

Figure 10:
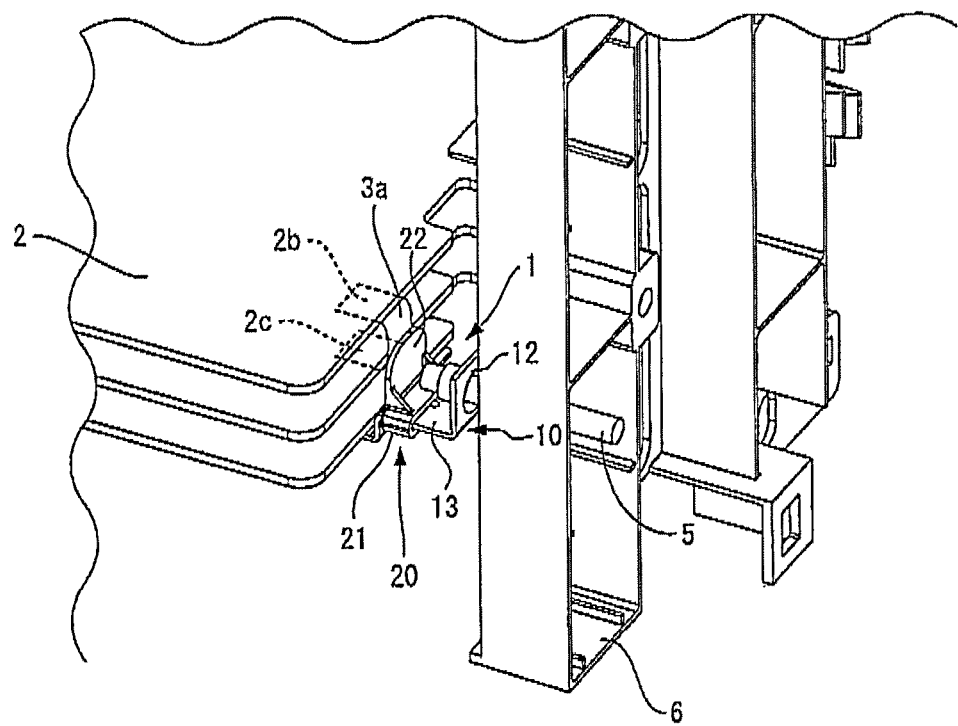
FIG. 10 shows perspectively a screwed state of the male screw into the module terminal.
Figure 11A:
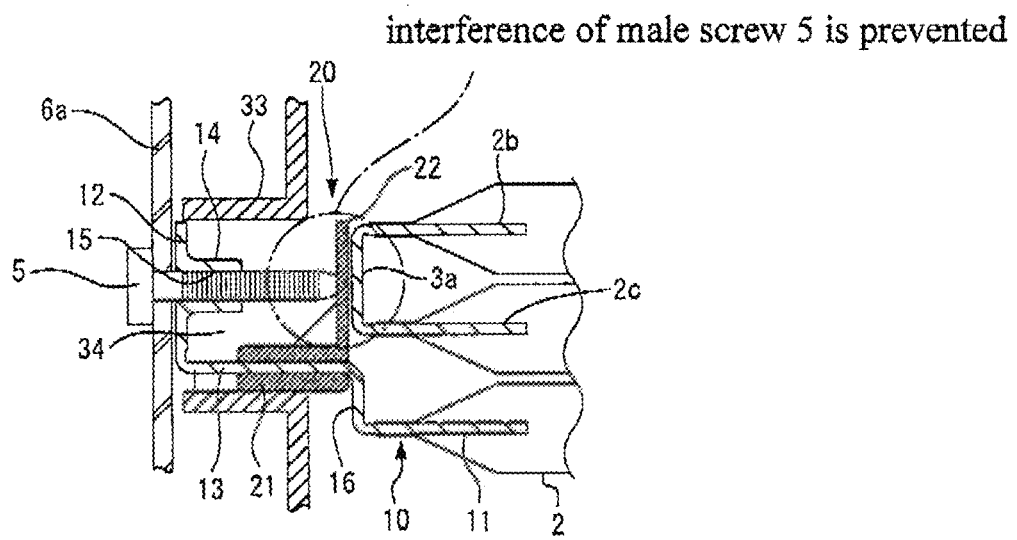
FIG. 11A shows cross-sectionally the screwed state.

FIG. 10 shows perspectively a screwed state of the male screw into the module terminal according to the embodiment. FIG. 11A shows cross-sectionally the screwed state, and FIG. 1113 shows a case where no interference preventive member is provided.

As shown in FIGS. 10 and 11A, when the male screw 5 is fastened in the module terminal 1, the wall portion 22 of the interference preventive member 20 is interposed between the distal end of the male screw 5 and the end face of the battery pack 3. Namely, when the male screw 5 is screwed into the female screw portion 15, the wall portion 22 prevents the male screw 5 from interfering with the positive terminal 2b and the negative terminal 2c (and the conductor member 3a) of the laminated battery cells 2 which are connected together to make up the battery pack 3.

Figure 11B:
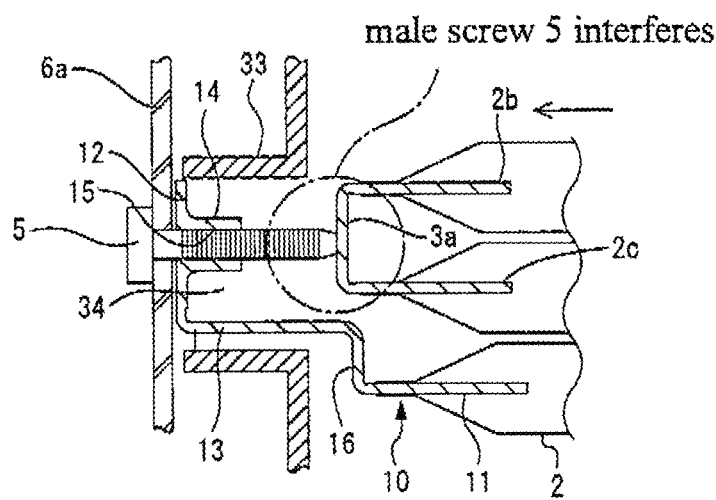
FIG. 11B shows a case where no interference preventive member is provided.

For example, as shown in FIG. 11B, in the case where the interference preventive member 20 is not present, when the male screw 5 is screwed into the female screw portion 15 to penetrate the terminal portion 12 of the terminal main body 10, the distal end of the male screw 5 faces the end face of the battery pack 3. In this state, when vibration or impact is applied to the module 4, the laminated battery cells 2 of the battery pack 3 are moved, and the respective terminals 2b, 2c (and the conductor member 3a) of the laminated battery cells 2 may interfere with the distal end of the male screw 5. When the male screw 5 interferes with the terminals, a short circuit is caused. When a short circuit is caused, the supply voltage of the module 4 is reduced, and the battery energy density of the module 4 becomes unstable. Additionally, the short circuit may trigger heating and burning of the module 4.

As shown in FIG. 11A, by providing the wall portion 22 between the distal end of the male screw 5 and the end face of the battery pack 3, the interference between the respective terminals 2b, 2c (and the conductor member 3a) of the laminated battery cells 2 and the male screw 5 can be prevented. Thus, no short circuit is generated between the laminated battery cells 2, and the energy density of the module 4 can be stabilized. Further, the damage can also be prevented which would otherwise be made to the laminated battery cells 2 and their terminals 2b, 2c (and the conductor member 3a) as a result of the interference of the male screw 5 therewith.

Modified Example 1

FIGS. 12A to 12E show a module terminal according to a modified example of the first embodiment.

Figure 12A:
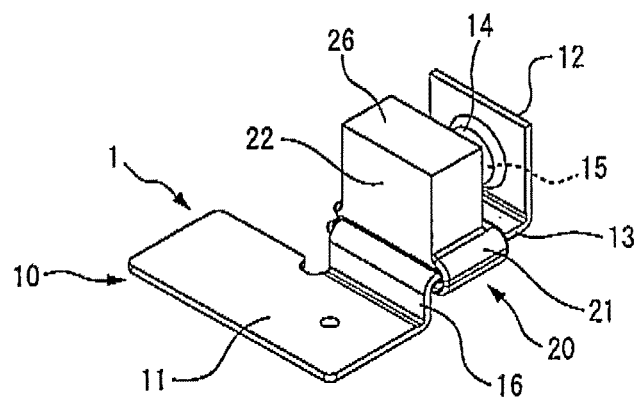
FIGS. 12A to 12E show a module terminal according to a modified example of the first embodiment.
Figure 12B:
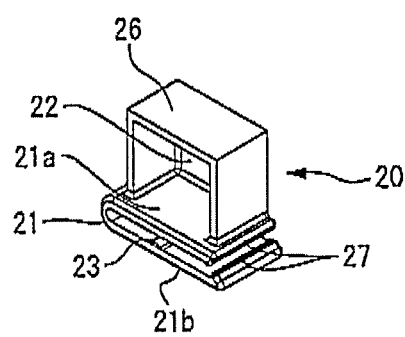
Figure 12C:
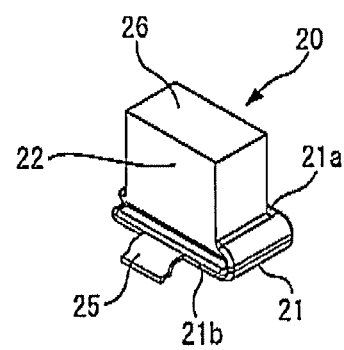
Figure 12D:
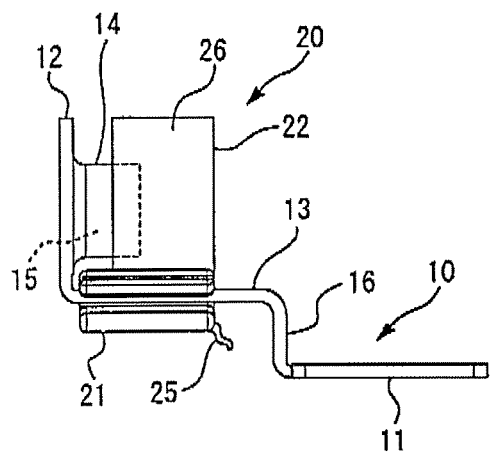
Figure 12E:
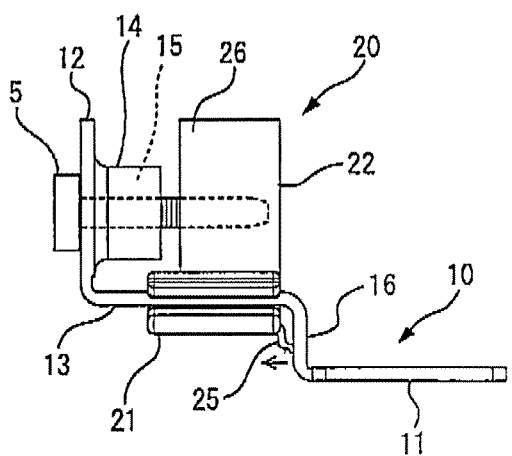

In a module terminal 1, an elastic piece (biasing means) 25 can be formed integrally with a mounting portion 21 when an interference preventive member is resin molded (refer to FIGS. 12C and 12D). When the mounting portion 21 moves towards laminated battery cells 2, this elastic piece 25 abuts a bent portion 16 of a terminal main body 10 at a distal end portion thereof and deflects elastically. As a result, a biasing force acts in an opposite direction to the moving direction of the mounting portion 21 (toward the terminal portion 12), thereby elastically pushing back the interference preventive member 20. As shown in FIG. 12E, when the male screw 5 is screwed into the female screw portion 15 of the module terminal 1, the wall portion 22 abuts the distal end of the male screw 5 with a biasing force. Thus, even when vibration is applied to the module terminal 1 from the outside, the looseness or unintentional sliding of the interference preventive member 20 can be prevented.

As shown in FIGS. 12A and 12B, the module terminal 1 may include a side wall 26 which extends from a circumferential edge of the projecting wall portion 22 parallel to a base portion 21a of the mounting portion 21. When the interference preventive member 20 is positioned close to the terminal portion 12, a female screw portion 15 is inserted into a space defined by the wall portion 22 and the side wall 26 (refer to FIG. 12D). Thus, the interior of the insertion hole 34 before the male screw 5 is screwed thereinto can be closed by the wall portion 22 and the side wall 26 of the interference preventive member 20, thereby preventing the intrusion of dirt or dust into the interior of the module 4 from the female screw portion 15.

Moreover, since the side wall 26 is disposed inside the insertion hole 34 on the lid member 32 shown in FIG. 2 in addition to the terminal portion 12 of the terminal main body 10, the rotation of the module terminal 1 is prevented by the inner circumferential surface of the insertion hole 34 (inner wall of the extending portion 33 provided circumferentially). Namely, when the male screw 5 is screwed into the female screw portion 15, a rotational force of the male screw is transmitted to the interference preventive member 20 via the terminal main body 10. This rotational force is absorbed by the side wall 26 and the terminal portion 12 of the terminal main body 10 when they abut the inner circumferential surface of the insertion hole 34 (refer to FIG. 2). Thus, the side wall 26 and the terminal portion 12 function as a stopper for preventing the rotation of the terminal main body 10 and the interference preventive member 20.

Modified Example 2

Figure 13A:
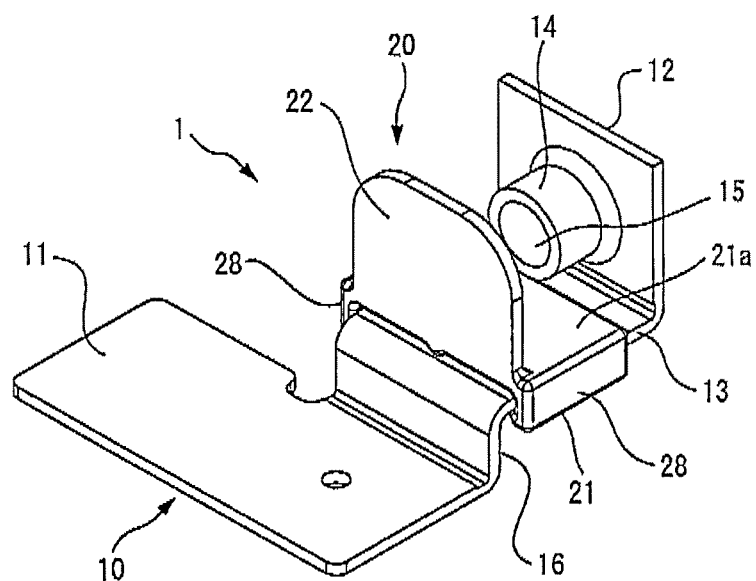
FIGS. 13A and 13B show a module terminal according to another modified example of the first embodiment.
Figure 13B:
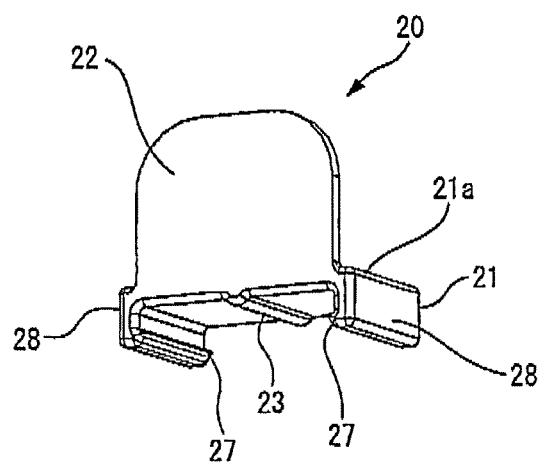

FIGS. 13A and 13B show a module terminal according to another modified example of the embodiment.

As shown in these figures, an interference preventive member 20 can have arm portions 28 extend from both end portions of a base portion 21a correspondingly with a thickness of a mounting area 13 of a terminal main body 10. A dislodgement preventive claw 27 is provided at a distal end of each of the arm portions 28 to engage with an edge of the mounting area 13. Thus, by holding the mounting area 13 with the arm portions 28, the interference preventive member 20 can easily be mounted on the terminal main body 10.

Namely, as long as the interference preventive member 20 is interposed between the distal end of the male screw 5 and the end face of the battery pack 3, the shapes of a mounting portion 21 and a wall portion 22 can be freely designed.

Second Embodiment

Next, a second embodiment of the invention will be described by reference to the drawings.

FIGS. 14 to 20B show a module terminal according to the second embodiment. Like reference numerals will be given to portions corresponding to those of the first embodiment, and the detailed description thereof will be omitted.

Figure 14:
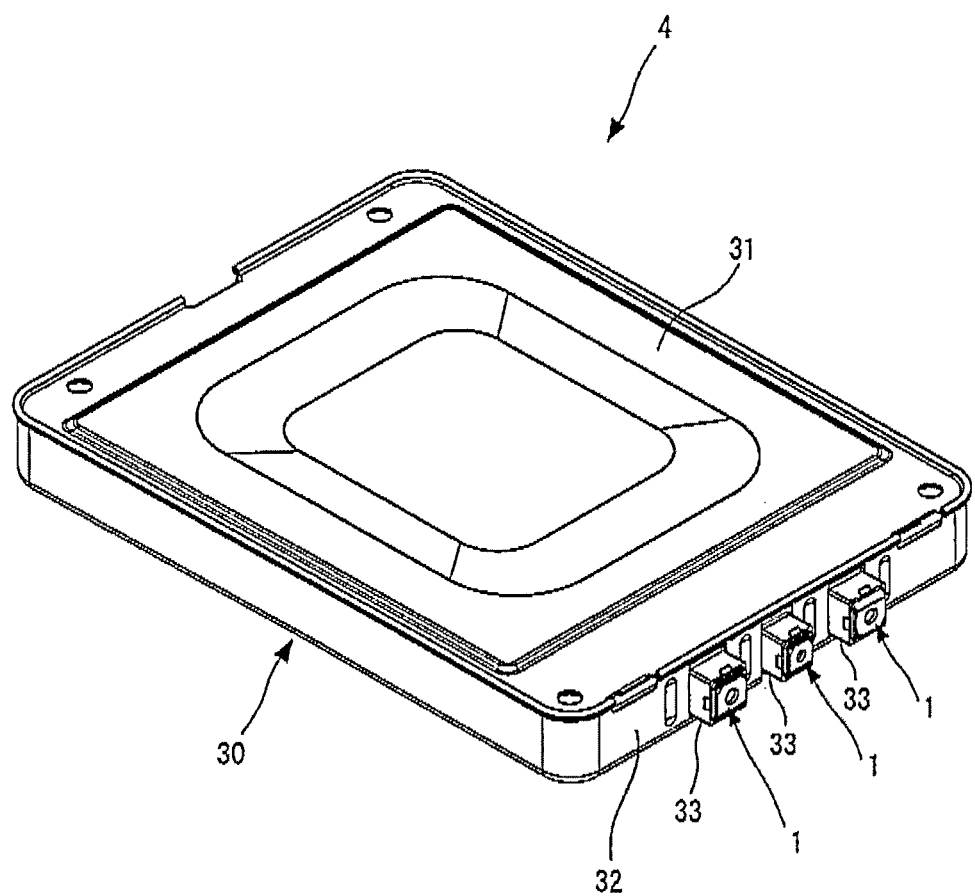
FIG. 14 shows a module in which module terminals according to a second embodiment are incorporated.

As shown in FIG. 14, as with the first embodiment, a module terminal 1 of this embodiment is incorporated in a module 4 which incorporates a battery pack 3 made up of plural laminated battery cells 2 as a terminal for inputting and outputting electric power.

Figure 15:
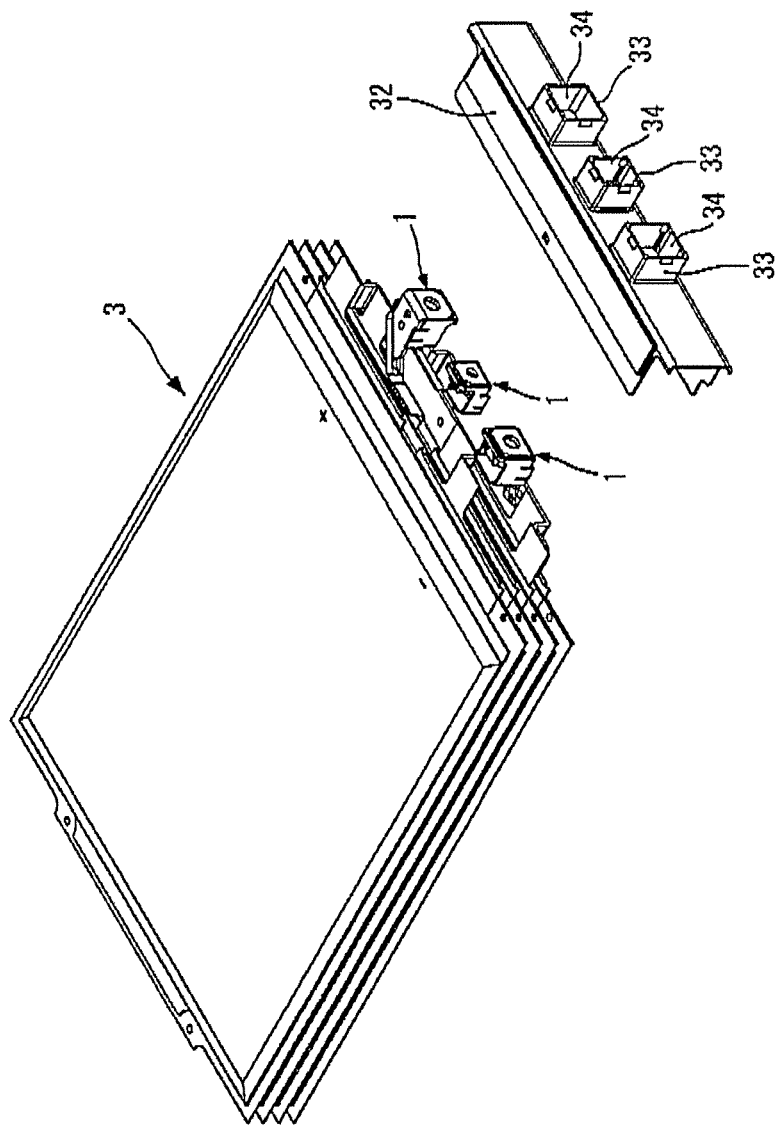
FIG. 15 shows an exploded state of the module shown in FIG. 14.

As shown in FIGS. 14 and 15, the module 4 includes the battery pack 3 which is made up by connecting the plural laminated battery cells 2 together, a casing 30 which encloses the battery pack 3 and module terminals 1 for inputting/outing electric power to/from the battery pack 3. The configuration of the laminated battery cell 2 is already described in the first embodiment.

As shown in FIG. 15, in the battery pack 3, the laminated battery cells 2 are stacked in plural layers (four layers in this embodiment) and aligned in plural rows (two rows also in this embodiment, although not specifically shown). Although not specifically shown, as with those of the first embodiment, two laminated battery cells 2 which are aligned side by side on the same flat plate are electrically connected to each other at a positive terminal 2b and a negative terminal 2c via a conductor member 3a (refer to FIG. 4).

Figure 16:
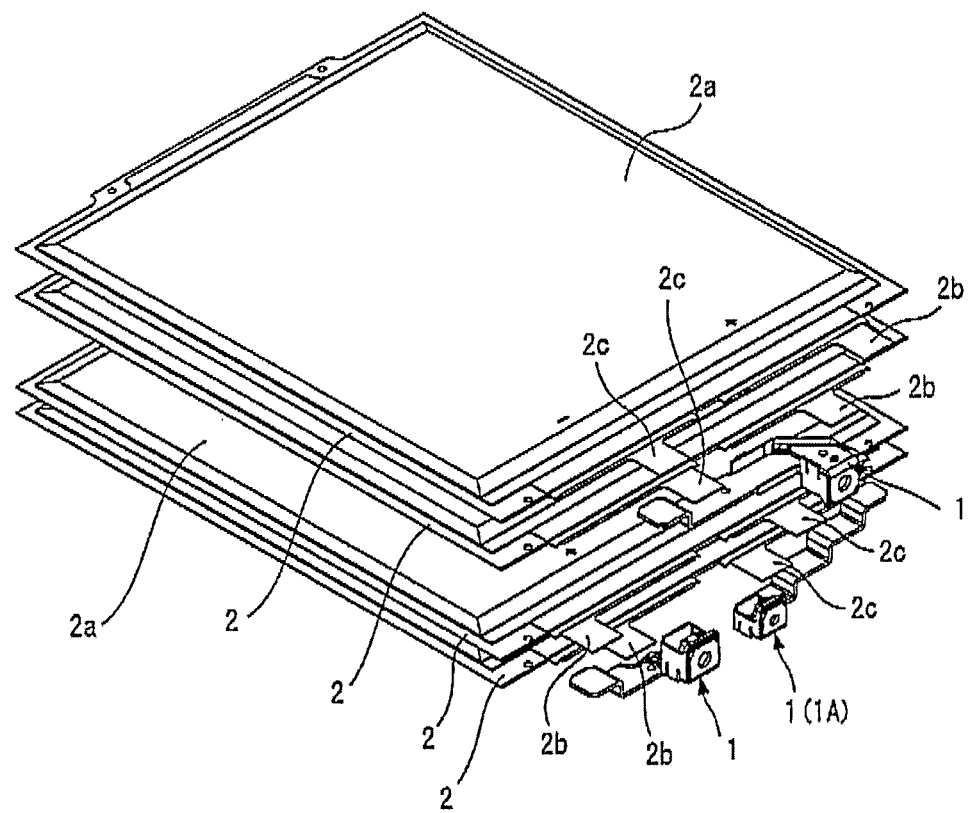
FIG. 16 shows an electrical connection of laminated battery cells accommodated in the module shown in FIG. 14.

On the other hand, at front end portions of those laminated battery cells 2, as shown in FIG. 16, a positive terminal 2b and a negative terminal 2e of each of a lower pair of stacked laminated battery cells 2 and an upper pair of stacked laminated battery cells 2 are electrically connected by a module terminal 1. Additionally, in this embodiment, the module 4 includes a module terminal (1A in FIG. 16) for measuring an intermediate voltage of the battery pack 3. This module terminal 1A is electrically connected to the electrode terminals (the positive terminals 2b or the negative terminals 2c) of the four laminated battery cells 2 which are stacked in the four layers.

In this embodiment, the module 4 incorporates two electric power input/output module terminals 1 (which are disposed horizontally) and an intermediate voltage measuring module terminal 1 (disposed at the center).

Figure 17A:
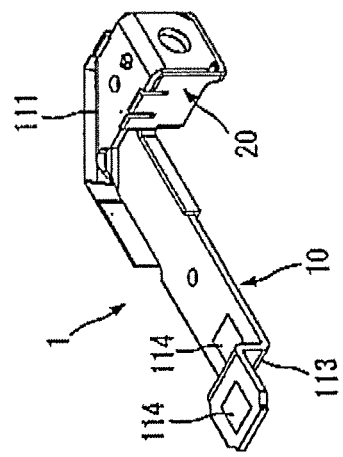
FIGS. 17A to 17F show three types of module terminals according to the second embodiment.
Figure 17C:
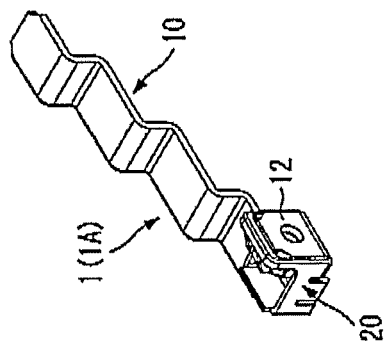
Figure 17E:
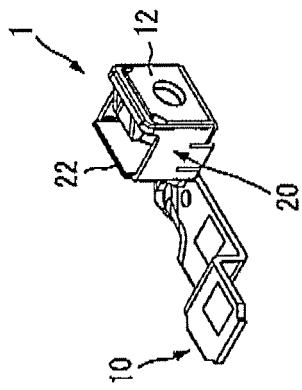
Figure 17B:
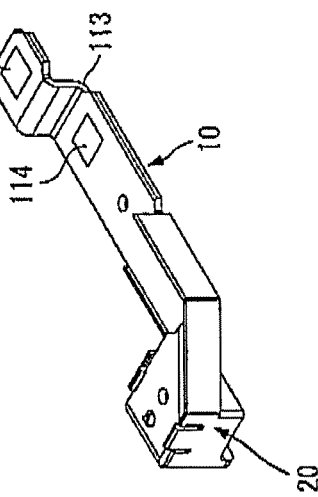
Figure 17D:
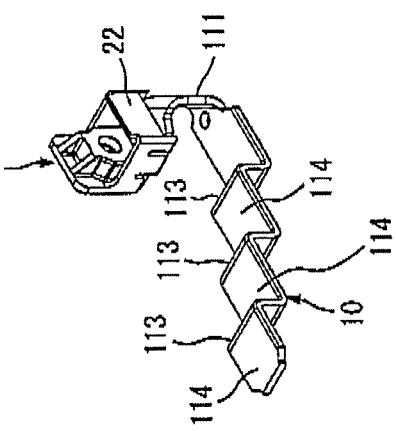
Figure 17F:
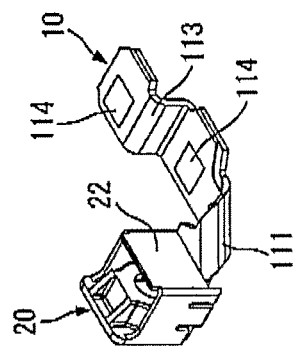

FIGS. 17A to 17F show three types of module terminals according to this embodiment. FIGS. 17A and 17B show one of the electric power input/output module terminals as seen in different directions, FIGS. 17C and 17D show the intermediate voltage measuring module terminal as seen in different directions, and FIGS. 17E and 17F show the other of the electric power input/output terminal modules in different directions.

As shown in these figures, among the three types of module terminals 1, while the shape of a terminal main body 10 and the size/shape of an interference preventive member 20 are different, the characteristic configurations are common.

Thus, one of the three types of module terminals 1 will be picked up for detailed description.

Figure 19A:
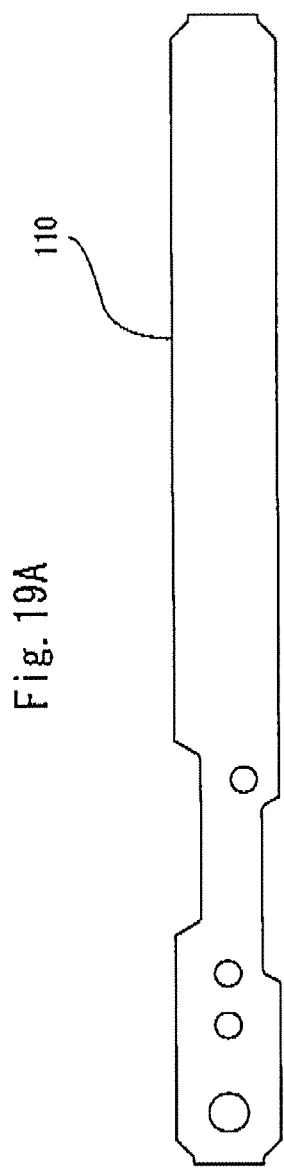
FIGS. 19A and 19B show a terminal main body according to the second embodiment.
Figure 19B:
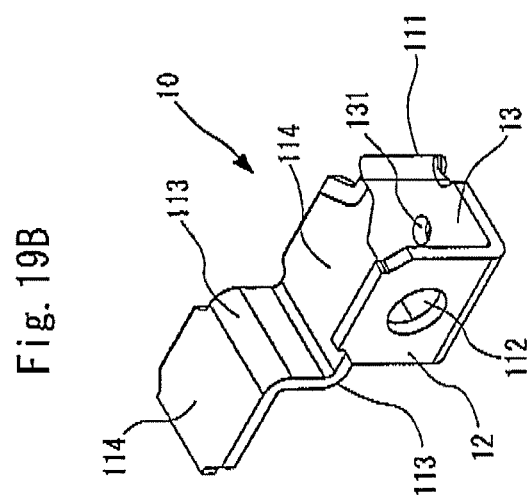
Figure 20A:
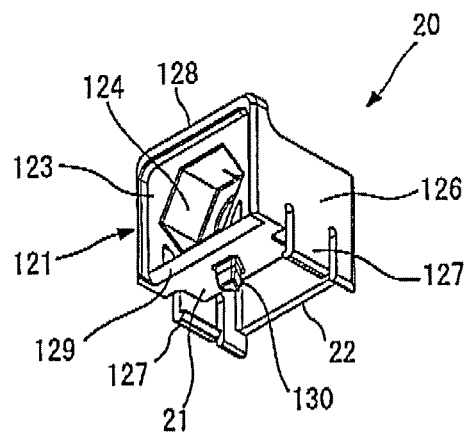
FIG. 20A shows perspectively the interference preventive member.
Figure 20B:
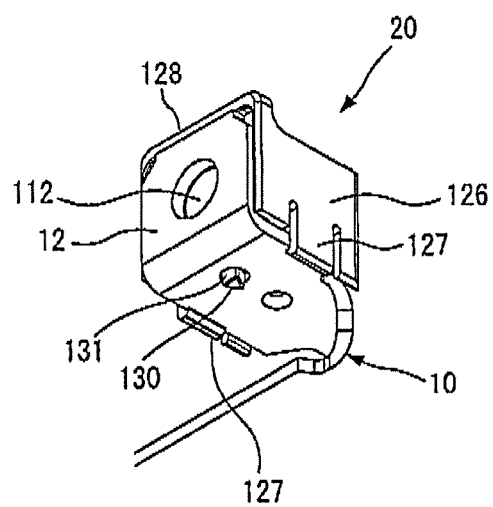
FIG. 20B shows the terminal main body and the interference preventive member mounted thereon.

FIGS. 18 to 20B show a module terminal according to this embodiment. FIG. 18 shows an exploded state, FIGS. 19A and 19B show a terminal main body, and FIGS. 20A and 20B show an interference preventive member.

As shown in FIG. 18, the module terminal 1 of this embodiment also includes a terminal main body 10 and an interference preventive member 20.

The terminal main body 10 is formed by bending three-dimensionally a belt-shaped metal plate 110 as shown in FIG. 19A. The belt-shaped metal plate 110 is twisted upwardly and then drawn perpendicularly at an intermediate twisted portion 111.

In this embodiment, too, one end portion of the terminal main body 10 is bent substantially at right angles to thereby form a terminal portion 12 (refer to FIG. 19B). This terminal portion 12 is formed into a substantially square flat plate shape and fixes an electric wiring in cooperation with a male screw 5. A through hole 112 for inserting the male screw 5 is bored substantially in the center of the terminal portion 12.

A certain area from a proximal end of the terminal portion 12 is formed into a flat plate-shaped mounting area 13 on which the interference preventive member 20 is mounted.

In this embodiment, the terminal main body 10 is bent to form a step portion 113 (refer to FIG. 17B), and a flat surface 114 which continuously extends from the step portion 113 is electrically connected to the electrode terminal 2b or 2c of the laminated battery cell 2 shown in FIG. 16.

The interference preventive member 20 is a resin molded product formed of an insulative synthetic resin. In the interference preventive member 20, as shown in FIG. 18, a female screw portion 120 is formed to face a wall portion 22. This female screw portion 120 includes a female screw holder 121 which faces the wall portion 22 and a nut member 122 which is mounted in the female screw holder 121.

The female screw holder 121 has a front wall portion 123 which faces the wall portion 22. At a central portion of the front wall portion 123, a fitting depressed portion 124 having an internal shape that matches an external shape (hexagonal shape) of the nut member 122 is formed so that the nut member 122 is press fitted in the fitting depressed portion 124 (refer to FIG. 18). A through hole 125 is formed in the front wall portion 123. When the nut member 122 is press fitted in the fitting depressed portion 124, the through hole 125 faces a threaded hole in the nut member 122.

When the male screw 5 is screwed into the nut member 122, a distal end of the male screw 5 penetrates the through hole 125 and faces the wall portion 22.

The female screw holder 121 and the wall portion 22 are connected together at both left and right side edges thereof by a pair of side walls 126, 126. Additionally, locking claws 127, 127 extend from edges (lower edges in FIG. 18) of the side walls 126, 126. These locking claws 127, 127 face each other at an interval corresponding to the width of the mounting area 13 of the terminal main body 10. Then, these locking claws 127, 127 elastically engage with both side edges of the mounting area 13 from the outside, thereby mounting the interference preventive member 20 on a flat surface of the mounting area 13 (refer to FIG. 203). As this occurs, the locking claws 127, 127 project further than a bottom surface of the mounting area 13.

In this embodiment, a bottom portion of the interference preventive member 20 which includes the edges of the side walls 126, 126 from which the locking claws 127, 127 extend functions as a mounting portion where the interference preventive member 20 is mounted on the terminal main body 10.

When the interference preventive member 20 is mounted on the mounting area 13 of the terminal main body 10, the terminal portion 12 of the terminal main body 10 faces the front wall portion 123 of the female screw holder 121. Then, the through hole 112 in the terminal portion 12 faces the threaded hole in the nut member 122.

A circumferential wall portion 128 extends forwards from an outer circumferential edge of the front wall portion 123 which is formed on the female screw holder 121. Thus, the circumferential wall portion 128 covers a circumference of the terminal portion 12 which faces the front wall portion 123. The circumferential wall portion 128 extends from both side edges and an upper edge of the front wall portion 123, and a portion lying close to a lower edge is formed into a cutout portion 129 where the circumferential wall portion 128 is not formed.

The interference preventive member 20 is assembled on the terminal main body 10 by introducing the terminal portion 12 from the cutout portion 129 to be guided along the front wall portion 123. During the process of assembling, the locking claws 127, 127 can elastically engage with the mounting area 13 with a proper posture.

As shown in FIG. 20A, a positioning pin 130 is formed on the bottom surface (mounting portion) of the interference preventive member 20. On the other hand, a positioning hole 131 is bored in the mounting area 13 of the terminal main body 10. By inserting the positioning pin 130 in the positioning hole 131, the interference preventive member 20 is positioned with respect to the terminal main body 10. This positioning pin 130 has a pyramid shape which is tapered from a proximal end towards a distal end thereof and is sized such that side vertexes abut an inner circumference of the positioning hole 131 at the proximal end thereof.

During the process of assembling the interference preventive member 20 on the terminal main body 10 by introducing the terminal portion 12 from the cutout portion 129, the positioning pin 130 can also be inserted into the positioning hole 131 with a proper posture.

As with the first embodiment, in this module terminal 1 of this embodiment, too, as shown in FIG. 15, the terminal portion 12 of the terminal main body 10 and the interference preventive member 20 are disposed in the extending portion 33 which is formed on the lid member 32 of the casing 30.

Thus, an outer circumferential edge of the female screw holder 121 and the side walls 126 of the interference preventive member 20 abut the inner circumferential surface of the extending portion 33 by the rotational moment received from the male screw 5, thereby preventing the entrainment of the terminal portion 12 and the interference preventive member 20. Consequently, the terminal main body 10 is prevented from moving to thereby interrupt the electrical connection between the electrode terminal 2a or 2b of the laminated battery cell 2 and the module terminal 1.

The circumferential wall portion 128 formed on the female screw holder 121 of the interference preventive member 20 covers the circumference of the terminal portion 12 of the terminal main body 10. Therefore, the terminal portion 12 does not abut the inner circumferential surface of the extending portion 33 on the lid member 32, thereby preventing the generation of metallic striking sound. Further, the locking claws 127, 127 of the interference preventive member 20 are interposed between the side edges and the bottom surface of the mounting area 13 of the terminal main body 10 and the inner circumferential surface of the extending portion 33 of the casing 30. Therefore, the side edges and the bottom surface of the mounting area 13 of the terminal main body 10 do not abut the inner circumferential surface of the extending portion 33 of the casing 30, thereby also preventing the generation of metallic striking sound.

As with the first embodiment, in this module terminal 1 of this embodiment, too, the interference preventive member 20 is interposed between the distal end of the male screw 5 and the battery pack 3. Thus, when the male screw 5 is screwed into the module terminal 1, since the distal end of the male screw 5 abuts the interference preventive member 20, the interference of the male screw 5 with the main body or the terminal of the laminated battery cell 2 can be avoided.

The interference preventive member 20 and the associated configuration of the second embodiment can be applied to the module terminal 1 of the first embodiment, and reversely, the interference preventive member 20 and the associated configuration of the first embodiment can be applied to the module terminal 1 of the second embodiment.

The invention claimed is:

1. A module terminal to be incorporated into a module, the module terminal being provided for inputting/outputting electric power to/from a plurality of laminated battery cells of a battery pack of the module, each of the laminated battery cells including an interior electrode pair, a separator, an electrolyte, and a sheath which seals the interior electrode pair, the separator, and the electrolyte, the module terminal including:
   a terminal main body which comprises a metallic plate, which includes a terminal portion for fixing an electric wiring in cooperation with a male screw, and which is electrically connected to the battery pack; and
   an insulative interference preventive member which is a separate part from the terminal main body, from the sheath of said each of the laminated battery cells, and from a casing which accommodates the battery cells, and which is mounted on the terminal main body,
   wherein the terminal main body or the interference preventive member includes a female screw portion for screwing the male screw therethrough such that a distal end of the male screw faces an end face of the battery pack, and
   wherein the interference preventive member is disposed between the distal end of the male screw that is screwed into the female screw portion and the end face of the battery pack, such that the interference preventive member includes a mounting portion detachably mounted on the terminal main body and a wall portion disposed between the distal end of the male screw that is screwed into the female screw portion and the end face of the battery pack.

2. The module terminal of claim 1, wherein the terminal main body is formed by one end portion of the terminal portion, and the female screw portion is provided in the terminal portion.

3. The module terminal of claim 2, wherein the interference preventive member is provided with biasing means for biasing the interference preventive member towards the terminal portion of the terminal main body in which the female screw portion is formed.

4. The module terminal of claim 2, wherein, in the terminal main body, a cylindrical bulge portion is drawn from the terminal portion, and the female screw portion is formed on an inner circumferential surface of the bulge portion.

5. The module terminal of claim 2, wherein a flat plate-shaped mounting area is formed on the terminal main body, wherein the mounting portion of the interference preventive member includes a flat plate-shaped base portion and a flexible clip-like mounting piece which is disposed parallel to a bottom surface of the base portion with a constant space defined therebetween, one side edges of the base portion and the mounting piece being connected, and wherein the interference preventive member is slidably mounted on the terminal main body by holding the mounting area with the base portion and the mounting piece.

6. The module terminal of claim 5, wherein the mounting portion of the interference preventive member is fitted in the mounting area of the terminal main body from other side edges of the base portion and the mounting piece which are opened, and dislodgement preventive claws are formed on the other side edges of the base portion and the mounting piece so as to engage with edges of the mounting area.

7. The module terminal of claim 5, wherein, in the terminal main body, an end portion of the mounting area which lies closer to another end portion is bent to form a bent portion as a stopper which restricts a sliding range of the interference preventive member.

8. The module terminal of claim 1, wherein the interference preventive member includes the female screw portion so as to face the wall portion.

9. The module terminal of claim 8, wherein the female screw portion includes a female screw holder which faces the wall portion and a nut member which is mounted in the female screw holder.

10. The module terminal of claim 9, wherein the female screw holder is configured to be inserted in an angular tube-shaped extending portion formed in the casing that accommodates the battery pack and abuts an inner circumferential surface of the extending portion by a rotational moment received via the female screw holder from the male screw to restrict an entrainment of the interference preventive member.

11. The module terminal of claim 10, wherein the interference preventive member includes a side wall on each of side surfaces so as to be connected to the wall portion and the female screw holder, and when the side walls are inserted in the angular tube-shaped extending portion, the side walls abut the inner circumferential surface of the extending portion by the rotational moment received via the interference preventive member from the male screw to restrict the entrainment of the interference preventive member.

12. The module terminal of claim 10, wherein the terminal portion is formed by one end portion of the terminal main body, and a mounting area is formed on a portion of the terminal main body other than the one end portion, wherein the female screw holder includes a front wall portion formed to face the terminal portion of the terminal main body and a circumferential wall portion which covers a circumference of the terminal portion, and the front wall portion and the circumferential wall portion are connected to each other, wherein the interference preventive member includes locking claws formed at the mounting portion so as to elastically engage with the mounting area of the terminal main body, wherein the female screw holder includes a cutout portion formed in a part of the circumferential wall portion to introduce the terminal portion of the terminal main body to be guided to an opposite position to the front wall portion, wherein, during introducing the terminal portion of the terminal main body from the cutout portion to be guided to the opposite position to the front wall portion, the locking claws elastically engage with the mounting area of the terminal main body, wherein the terminal main body includes a positioning hole in the mounting area, wherein the interference preventive member includes a positioning pin which is inserted into the positioning hole, wherein, during introducing the terminal portion of the terminal main body from the cutout portion to be guided to the opposite position to the front wall portion, the positioning pin is inserted into the positioning hole, and wherein the positioning pin is formed into a pyramid shape which is tapered from a proximal end towards a distal end thereof and is sized such that side vertexes continues abutting an inner circumference of the positioning hole at the proximal end.

13. The module terminal of claim 10, wherein the female screw holder includes a circumferential wall portion which covers a circumference of the terminal portion of the terminal main body.

14. The module terminal of claim 13, wherein the terminal portion is formed by one end portion of the terminal main body, and a mounting area is formed on a portion of the terminal main body other than the one end portion, and wherein the interference preventive member includes locking claws formed to elastically engage with both side edges of the mounting area from an outside to project further than a bottom surface of the mounting area.

15. The module terminal of claim 14, wherein the female screw holder includes a front wall portion formed to face the terminal portion of the terminal main body, and the front wall portion and the circumferential wall portion are connected to each other, wherein the female screw holder includes a cutout portion formed in a part of the circumferential wall portion to introduce the terminal portion of the terminal main body to be guided to an opposite position to the front wall portion, and wherein, by introducing the terminal portion of the terminal main body from the cutout portion to be guided to the opposite position to the front wall portion, the locking claws elastically engage with both the side edges of the mounting area of the terminal main body from the outside, and the circumferential wall portion of the female screw holder covers the circumference of the terminal portion of the terminal main body.

16. The module terminal of claim 1, wherein the terminal main body is formed by bending three-dimensionally the metallic plate, and the terminal main body includes a twisted portion formed by twisting upwardly and then drawing perpendicularly an intermediate portion of the metallic plate.

17. The module terminal of claim 1, wherein the mounting portion of the interference preventive member includes a flat plate-shaped base portion and a mounting piece which is disposed parallel to a bottom surface of the base portion with a constant space defined therebetween.

18. The module terminal of claim 17, wherein a side edge of the base portion and a side edge of the mounting piece are connected to form a substantially U-shape portion of the mounting portion.

19. The module terminal of claim 18, wherein another side edge of the base portion and another side edge of the mounting piece are opened, and dislodgement preventive claws are formed on said another side edge of the base portion and said another side edge of the mounting piece to engage with edges of the terminal main body by slidably mounting the interference preventive member on the terminal main body.

20. The module terminal of claim 19, wherein the mounting piece comprises a rib located on a surface of the mounting piece which faces the base portion, the rib being configured to deflect the mounting piece from a mounting area of the terminal main body to prevent the interference preventive member from moving over the mounting area.

* * * * *